United States Patent

Mordini et al.

Patent Number: 5,952,032
Date of Patent: Sep. 14, 1999

[54] METHOD FOR FOAMING TEA CONCENTRATE

[75] Inventors: Mauro Dominick Mordini, Parsippany; Matthew Evan Harbowy, Ridgefield Park, both of N.J.

[73] Assignee: Lipton, Division of Conopco, Inc., Englewood Cliffs, N.J.

[21] Appl. No.: 08/929,854

[22] Filed: Sep. 15, 1997

[51] Int. Cl.[6] .................................. A23F 3/00; A23F 3/34
[52] U.S. Cl. ............................................ 426/597; 426/435
[58] Field of Search .................................... 426/597, 435, 426/511

[56] References Cited

U.S. PATENT DOCUMENTS 5,498,757   3/1996   Johnson et al. .......................... 426/522

OTHER PUBLICATIONS

Database Abstract. WPIDS for DE 4301539. Inventor: Linhart, Jul. 28, 1994.
Cecilware Brochures—1996.

*Primary Examiner*—Anthony J. Weier
*Attorney, Agent, or Firm*—Milton L. Honig

[57] ABSTRACT

A powdered tea concentrate, method for foaming the concentrate dispersed in water and a delivery system are provided to obtain a resultant foamed tea product. The powdered tea concentrate includes tea solids, sweetening agent and creaming agent. Delivery of foamed tea beverage is through a dispenser that includes a housing, a hopper for the powdered tea concentrate, a water inlet into the housing, a mixing chamber with an aerator mechanism and conduits for delivering the concentrate and water from respective hopper and inlet into the mixing chamber.

2 Claims, 2 Drawing Sheets

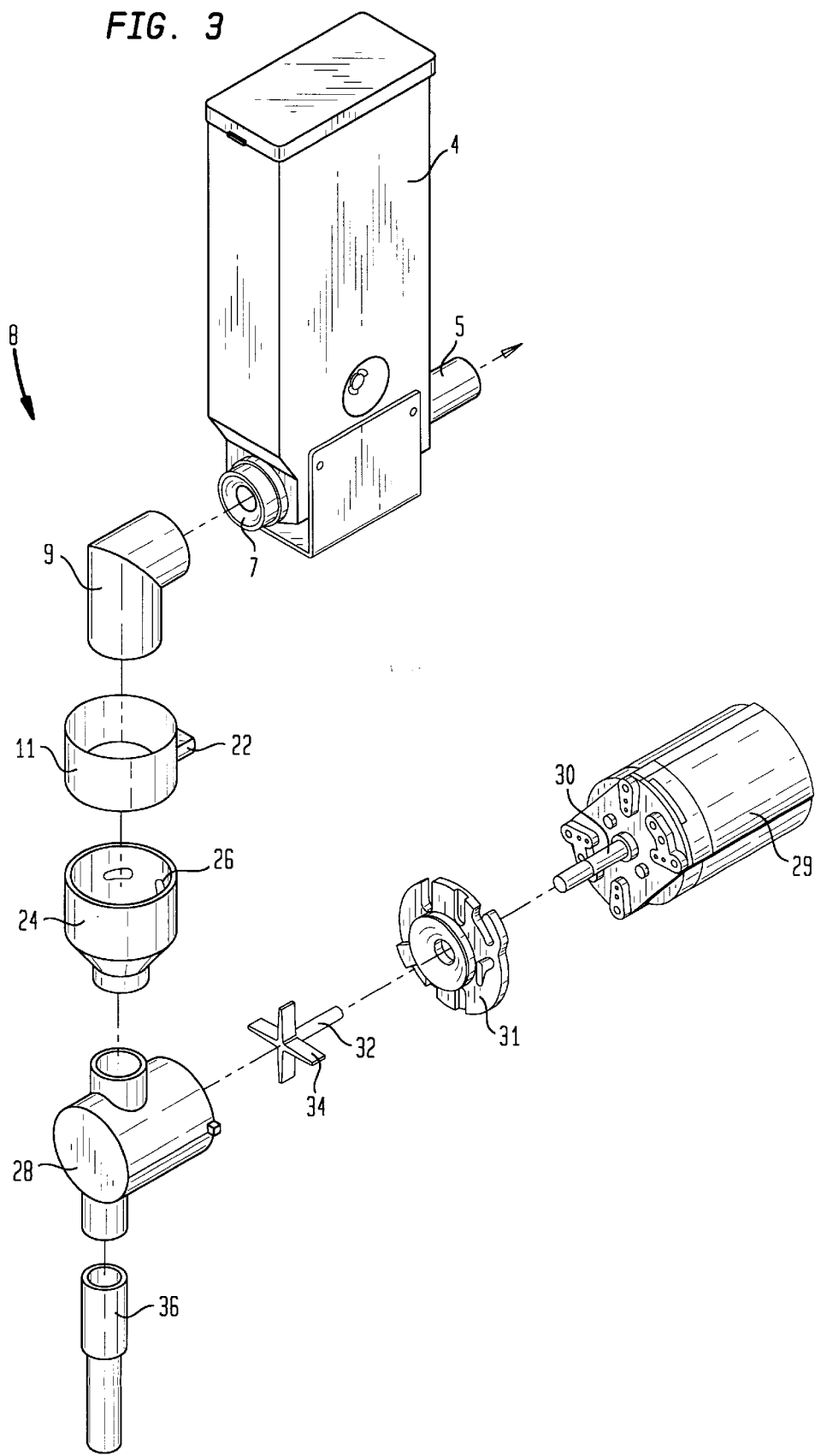

METHOD FOR FOAMING TEA CONCENTRATE

BACKGROUND OF THE INVENTION

1. Field of the Invention

The invention concerns a powdered tea concentrate, a method for foaming the concentrate when dispersed in water and a delivery system for providing the resultant foamed tea product.

2. The Related Art

Teas are considered to be elegant beverages. They can be served hot or cold. Additional ingredients are sometimes incorporated into the beverage. Sweetener is most prominent. Sometimes a creaming agent and even spices are blended into the beverage. One example is chai tea which is a combination of tea extract, dairy or non-dairy creamer and spices such as cardamon, cinnamon, ginger, black pepper and even vanilla.

Some of the aforementioned beverages froth slightly when initially prepared. Foam is found in a number of beverages. These include beer, malteds and cappuccino. Consumers consider the frothed portions of these products to at least some extent enhance their digestive pleasure. A need exists for more exciting tea-based drinks and desserts; foamed products may answer such need.

Accordingly, it is an object of the present invention to provide a tea-based product sporting a head of foam.

Another object of the present invention is to provide a quick delivery system for preparing whipped or foamed tea-based beverages.

Still another object of the present invention is to provide a method and apparatus for delivering foamed tea-based beverages of improved physical stability and taste characteristics.

SUMMARY OF THE INVENTION

A foamed tea beverage delivery system is provided which includes:
i) a powdered tea composition including:
   a) a powdered tea;
   b) a creaming agent for whitening the beverage; and
   c) a sweetening agent to increase sweetness of the beverage;
ii) a dispenser which includes:
   a) a housing;
   b) a hopper for the powdered tea composition, the hopper being positioned within the housing;
   c) a water inlet into the housing;
   d) a mixing chamber;
   e) a rotating impeller functioning to aerate the beverage, the impeller spinning within the mixing chamber; and
   f) conduits for delivering the powdered tea and water from respective hopper and water inlet into the mixing chamber.

Furthermore, a method for foaming tea beverages is provided which includes the steps of:
i) charging a hopper of a beverage dispensing machine with a powdered tea composition, the composition including powdered tea, a creaming agent for whitening the beverage and a sweetening agent;
ii) delivering a measured charge of powdered tea composition and water to a mixing chamber of the dispenser;
iii) aerating contents of the mixing chamber by activating an impeller to whip the powdered tea composition and water together to obtain a foamed tea beverage;
iv) discharging from the mixing chamber the foamed tea beverage; and
v) receiving the discharged foamed tea beverage in a receptacle outside the machine.

Also provided is a foamed tea beverage exhibiting a foam head maintaining a height above a liquid level of the beverage greater than 1 cm, preferably greater than 2 cm, optimally greater than 3 cm for at least two minutes after being dispensed, the beverage being generated from a combination of water and powdered tea composition comprising:
a) a powdered tea;
b) a creaming agent for whitening the beverage; and
c) a sweetening agent to increase sweetness of the beverage.

DETAILED DESCRIPTION OF THE DRAWINGS

Further objects, features and advantages of the present invention will become more evident through consideration of the following drawings in which:

FIG. 3 is an expanded view of the materials flow system from powder to foamed tea shown in frontal view by FIG. 2.

DETAILED DESCRIPTION OF THE INVENTION

Figure 1:
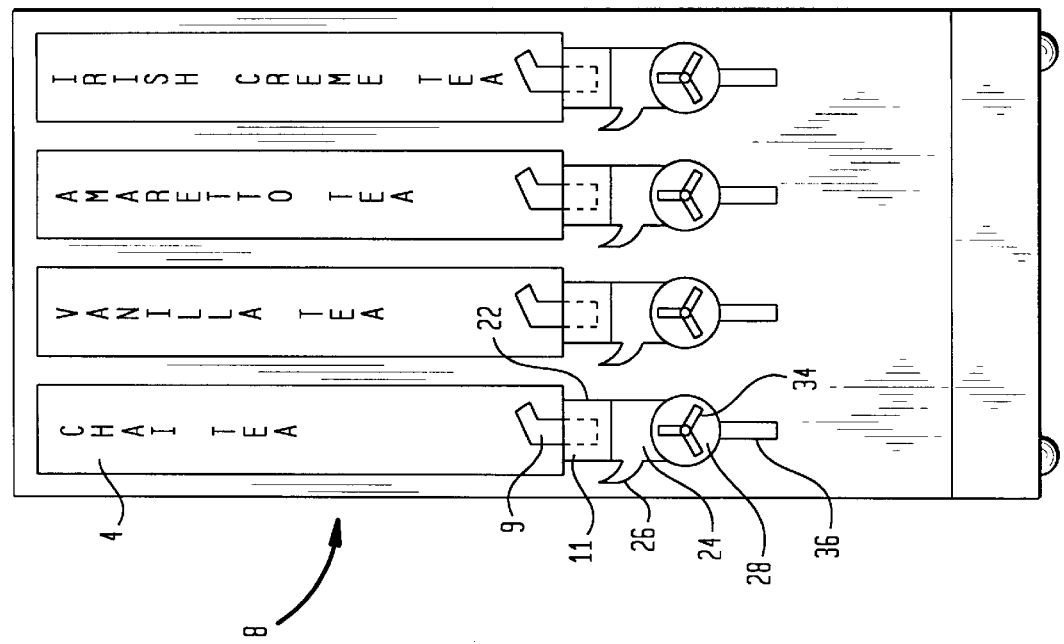
FIG. 1 is a front perspective view of a dispenser for delivering foamed tea products according to the present invention.

FIG. 1 illustrates a countertop dispenser for preparing the foamed tea products of the present invention. The dispenser includes a housing 2, a set of four hoppers 4 storing dry powdered tea concentrate, a water inlet 6 delivering water into the housing, and a materials flow system 8 to combine powdered concentrate with water. Access to the hoppers 4 for purposes of refilling dry powdered concentrate into the hopper is facilitated by a door 10 pivotable along hinges 12. Along the front of the door is a panel 14 with push-buttons 16 which activate transfer of a pre-set powdered tea concentrate charge and water into a mixing system. Power control 18 and power light 20 operate to heat the water, activate drive motors and indicate readiness of the system.

Figure 2:
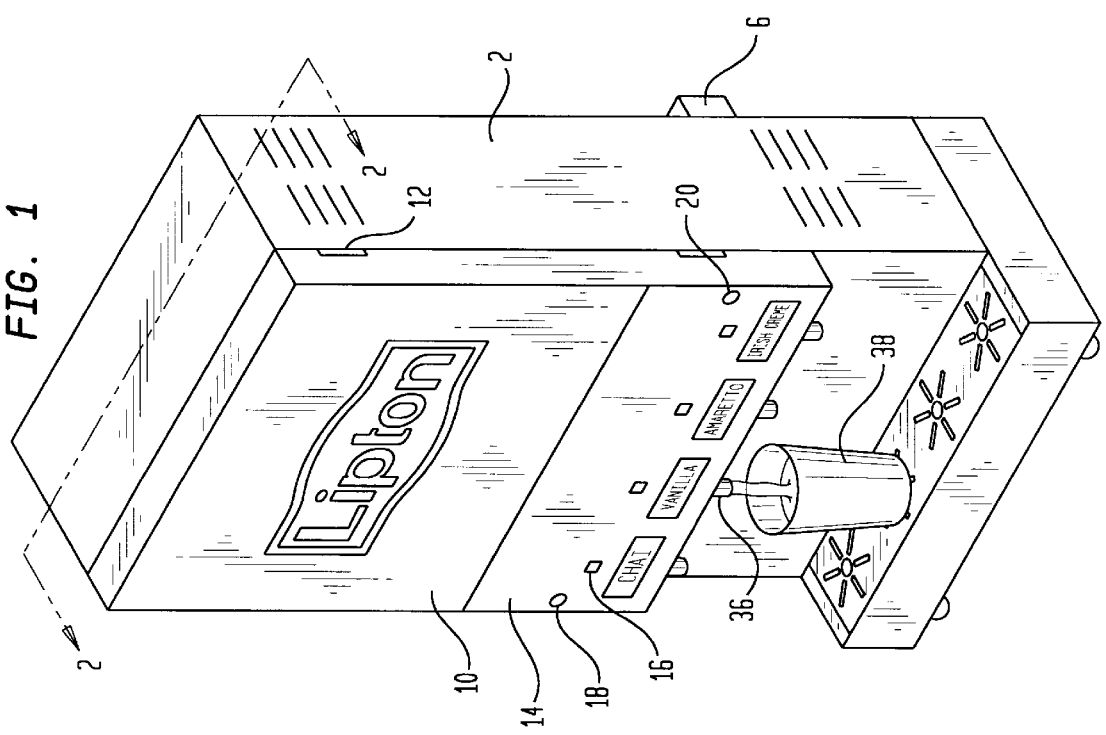
FIG. 2 is a cross-sectional view of the dispenser taken along 2—2 of FIG. 1.

FIGS. 2 and 3 best illustrate the tea beverage preparation materials flow system. Pressure on a tea beverage type selection button 16 initiates a drive motor to turn for a pre-set number of revolutions a slip coupling 5 which then rotates auger 7. Coupling and auger are positioned at a lower end of hopper 4. Rotation of the auger causes delivery of a pre-set amount of powdered tea concentrate from hopper 4 sequentially through an L-shaped diverter tube 9, a cover conduit 11 having a vapor exhaust outlet 22, and then a pre-mix bowl 24. Water from the inlet 6, which has been preheated within housing 2 is dispensed through conduit 26 in measured amount into bowl 24. Upon combination the charge of powdered concentrate/hot water is directed into mixing chamber 28. Sensors note the charge in the mixing chamber and activate a motor 29 rotating a motor shaft 30 which connects via a backing plate and coupling 31 to an impeller shaft 32 terminating in an impeller 34. Thereby the spinning blades of the impeller 34 rapidly mix the charged ingredients. Subsequent to a predetermined mixing time, the resultant hot foamed tea product is dispensed through nozzle tube 36 whose end protrudes through the housing. A cup or other receptacle 38 is placed beneath tube 36 receiving product in a ready to serve state.

Normally the dispenser will provide a hot foamed tea beverage. If a foamed iced version is desired, essentially identical equipment can be employed, except that cold water will replace the hot and ice can be supplied subsequent to dispensing into receptacle 38.

Dispensers of the present invention have been employed for purposes other than delivering foamed tea. These dispensers can be purchased from Cecilware Corporation, Long Island City, N.Y.

Powdered tea concentrates of the present invention include three essential elements. These are powdered tea, a sweetening agent and a creaming agent. Tea solids will be present in amounts from 0.01 to 2%, preferably from 0.04 to 1%, optimally from 0.10 to 0.6% by weight of the powdered concentrate. The term "tea solids" as used herein is defined as solids extracted from tea materials. Extraction is generally achieved through steeping of tea leaves which may be black, green or oolong type. Advantageously at least a portion of the tea solids are green tea having not undergone any fermentation of the leaves as occurs with the black variety.

Sweetening agents may be selected from mono- and disaccharides. These include sucrose, fructose, dextrose, maltose, lactose and invert sugar. Synthetic substitutes may also be utilized either alone or in combination with the saccharides. These substitutes include aspartame, saccharin, cyclomate and acetosulfam-K. Amounts of the sweetening agent may range from 0.01 to 30%, preferably from 1 to 20%, optimally from 5 to 15% by weight of the powdered concentrate.

Creaming agents for whitening the foamed tea product are also included within the powdered concentrate. Typical creaming agents include yogurt, whey, non-fat dry milk (NFDM) and non-dairy creamers such as partially hydrogenated coconut or soybean oils. Most preferred is non-fat dry milk because it also functions to improve foam in the final tea product. Amounts of the creaming agent may range from 0.1 to 30%, preferably from 1 to 20%, optimally from 5 to 15% by weight of the powdered concentrate.

A variety of flavors will also be included in the powdered concentrate. Illustrative but not limiting examples include such flavors as chai, Irish creme, hazelnut, chocolate, amaretto, vanilla, butter and mixtures thereof. Amounts of the flavor may range from 0.01 to 5%, preferably from 0.1 to 2%, optimally from 0.15 to 0.8% by weight of the total concentrate.

Spices may also be included within the powdered concentrate. Examples include cardamom, cinnamon, allspice, ginger, black pepper, cloves, nutmeg and mixtures thereof. Amounts of the spices may range from 0.05 to 5%, optimally from 0.1 to 2% by weight of the powdered concentrate.

Polysaccharide thickeners may optionally be present. Examples include sodium carboxymethyl cellulose, hydroxypropyl methyl cellulose, methyl cellulose, ethyl cellulose, xanthan gum, alginate, carageenan, pectin, gum arabic, guar gum and mixtures thereof. Amounts of the thickener when present may range from 0.01 to 2%, optimally from 0.2 to 0.6% by weight of the powdered concentrate.

The following examples will more fully illustrate the embodiments of this invention. All parts, percentages and proportions referred to herein and in the appended claims are by weight unless otherwise indicated.

EXAMPLE

Illustrative powdered tea concentrates for use in the present invention are described in the Table.

TABLE

| INGREDIENT | IRISH CREME | FRENCH VANILLA | AMARETTO | HAZELNUT | CHAI |
| --- | --- | --- | --- | --- | --- |
| Sugar | 13.38 | 13.40 | 13.49 | 13.42 | 13.70 |
| NFDM | 10.40 | 9.79 | 10.60 | 10.40 | 10.53 |
| Tea Flavor | 0.12 | 0.12 | 0.12 | 0.12 | 0.12 |
| Kenyan Tea | 0.46 | 0.46 | 0.46 | 0.46 | 0.46 |
| Dark Green Tea | 0.04 | 0.04 | 0.08 | 0.10 | 0.04 |
| Irish Creme Flavor | 0.66 | 0.00 | 0.00 | 0.00 | 0.00 |
| Cream Flavor | 0.14 | 0.00 | 0.08 | 0.04 | 0.12 |
| Hazelnut Flavor | 0.00 | 0.00 | 0.00 | 0.46 | 0.00 |
| Chocolate Flavor | 0.00 | 0.00 | 0.00 | 0.20 | 0.00 |
| Amaretto Flavor | 0.00 | 0.00 | 0.37 | 0.00 | 0.00 |
| Vanilla Flavor | 0.00 | 0.80 | 0.00 | 0.00 | 0.00 |
| Ethyl Vanillin | 0.00 | 0.55 | 0.00 | 0.00 | 0.00 |
| Butter Flavor | 0.00 | 0.04 | 0.00 | 0.00 | 0.03 |
| Chai Flavor | 0.00 | 0.00 | 0.00 | 0.00 | 0.20 |
| Total (g) | 25.20 | 25.20 | 25.20 | 25.20 | 25.20 |

Numbers in the Table reflect the gram weight per serving of finished foamed tea product. In the above Examples, 25.20 grams of powdered tea concentrate was mixed with 74.80 grams of hot water in an apparatus as described above and shown in FIGS. 1–3. Each of the frothed hot tea products exhibited an excellent head of foam.

The foregoing description and examples illustrate selected embodiments of the present invention. In light thereof variations and modifications will be suggested to one skilled in the art, all of which are within the spirit and purview of this invention.

What is claimed is:

1. A method for foaming tea beverages comprising the steps of:

i) charging a hopper of a beverage dispensing machine with a powdered tea composition, the composition including powdered tea, a creaming agent for whitening the beverage and a sweetening agent;

ii) delivering a measured charge of powdered tea composition and water to a mixing chamber of the dispenser;

iii) aerating contents of the mixing chamber by activating an impeller to whip the powdered tea composition and water together to obtain a foamed tea beverage;

iv) discharging from the mixing chamber the foamed tea beverage; and v) receiving the discharged foamed tea beverage in a receptacle outside the machine.

2. The method for foaming tea beverages according to claim 1 wherein the creaming agent is non-fat dry milk.

* * * * *